United States Patent [19]
Zaleski

[11] 3,939,011
[45] Feb. 17, 1976

[54] LITHIUM CELL WITH INTERNAL AUTOMATIC SAFETY CONTROLS

[75] Inventor: John F. Zaleski, Pleasantville, N.Y.

[73] Assignee: P. R. Mallory & Co. Inc., Indianapolis, Ind.

[22] Filed: Jan. 5, 1973

[21] Appl. No.: 321,186

[52] U.S. Cl. ............... 136/177; 136/133; 136/178
[51] Int. Cl.² ........................................ H01M 2/12
[58] Field of Search ................... 136/177, 178, 133

[56] References Cited
UNITED STATES PATENTS

| | | | |
|---|---|---|---|
| 1,930,578 | 10/1933 | Barrett | 136/178 X |
| 2,934,584 | 5/1960 | Warren et al. | 136/177 X |
| 3,143,441 | 8/1964 | Coleman | 136/178 |
| 3,338,750 | 8/1967 | Uny | 136/177 X |
| 3,423,242 | 1/1969 | Meyers et al. | 136/6 LN |
| 3,457,117 | 7/1969 | Angelovich | 136/133 |
| 3,503,806 | 3/1970 | Sugalski | 136/177 X |
| 3,617,386 | 11/1971 | Bosben | 136/177 X |
| 3,622,397 | 11/1971 | Belove | 136/178 |

Primary Examiner—Patrick P. Garvin
Assistant Examiner—John F. Niebling
Attorney, Agent, or Firm—Charles W. Hoffmann, Esquire; Ronald S. Cornell; Israel Nissenbaum

[57] ABSTRACT

An electric cell with a lithium/sulphur-dioxide electrolyte complex, corrosive and potentially dangerous, and having automatic protective structural features responsive to excessive internal temperatures or pressures that would be due to internal fault conditions or to external short-circuit conditions, with those protective features serving to selectively vent the cell or to break the internal cell circuit, to prevent explosive rupture of the cell and consequent possible damage to personnel in the adjacent surrounding environment by the corrosive ingredients of the cell.

17 Claims, 5 Drawing Figures

LITHIUM CELL WITH INTERNAL AUTOMATIC SAFETY CONTROLS

This invention relates to an electric energy cell, particularly of the lithium/sulphur dioxide type.

In many military and civilian applications, batteries are required to serve as standby energy sources in many environments where the temperature may drop to values as low as minus 60°F. At such temperatures, the ordinary conventional cell loses its ability to function properly and normally and therefore becomes useless.

Consideration has recently been given to a new type of primary cell utilizing a lithium/sulphur dioxide combination because of the unusual high quality operation over an extremely wide range of temperatures, particularly from a low temperature of minus 60°F to a normally usual ambient temperature.

There are many problems involved where lithium is used in a battery cell. Lithium itself is highly chemically active and reacts with many other elements, and, particularly, reacts explosively with water, or in the presence of moisture.

A primary electric cell of almost any type is generally hermetically sealed, in order to prevent leakage and to prevent access of moisture or any other foreign matter to the cell, since such leakage or such access could affect the predesigned operation of the cell and could lead to its deterioration. Where lithium is used in a cell, its potential of high activity, where not properly controlled, makes a hermetic seal imperative. Moreover, not only the final hermetic seal, but all the manufacturing processes in forming the cell before the hermetic seal is applied, must be restrictively controlled and safeguarded so that no moisture is permitted to enter into the cell, either during manufacture or after the cell container is closed and sealed.

In order to provide for proper cell operation with an adequate quantity of the sulphur dioxide gas, in an appropriately limited volumetric space, according to the cell dimensions, the gas must necessarily be under pressure, which under normal conditions and room temperature may stabilize at about 50 lbs. per square inch. Upon the evolution of heat within the cell, the pressure may rise within a relatively short time to 150 lbs. per square inch, or, in aggravated conditions, even to a pressure as high as 300 lbs. per square inch and cause explosion of the cell.

Several conditions that would generate excessive heat in the cell might cause such an excessive internal pressure. Internal or external short circuit conditions could do that.

An internal short circuit within the cell would generate heat which could remain internally concentrated and do damage before the heat could be conducted outward to an external surface to be dissipated, to prevent the development of a dangerous high internal pressure. An external short circuit on such a cell could cause a high internal resistance heating loss, which could also lead to a dangerous high internal pressure.

Under such resulting conditions of internal high pressure, such a cell might well rupture and explode, with a consequent force that would throw the corrosive materials and toxic fumes of the cell through a sufficient distance to possibly strike workers within a region near the cell. If such explosion should occur when the cell is in operation in a packaged assembly, it could occur in a confined region, or in a confining container, that might provide a possibly adequate safeguard against projectile injury to anyone present, but the fumes could still be hazardous. Thus, a short-circuit condition on such a cell, either because of an internal short circuit within the cell, or while the cell is being used in other ways, in an open unconfined atmosphere, could make the cell an extremely dangerous and hazardous projector of the highly reactive and corrosive materials, and of the toxic fumes of the cell.

Since pressure will be an end result of any troublesome conditions, including high temperature, whether within or outside of the cell, the excessive pressure condition is relied upon as an indicator of trouble, and a pressureresponsive action is arranged to provide the safety correcting operation to prevent harmful effects. Thus, pressure response is also essentially equivalent to temperature response.

One primary object of this invention is to prevent the development and accumulation of dangerous high pressure within such a cell, and, for that purpose, to provide some safeguard or safeguards which will selectively vent the cell when the internal atmospheric pressure of the cell becomes excessive.

Another important object of the invention is to provide what is in effect an internal circuit breaker for the cell, as a safeguard against an external short circuit condition that would generate a sudden high loss within the cell and that would create a rapid temperature rise and consequent high pressure condition, beyond the heat-dissipating ability of the cell.

In the cell of this invention, the selectively controlled venting prevents the accumulation of high pressure within the cell, while maintaining a substantial seal to prevent ingress of ambient air, which is an important feature of control.

To prevent the harmful effect within the cell that would result from an external short circuit in the cell, the cell is provided with an internal structure that constitutes essentially a circuit breaker, that operates to open the internal electrical circuit of the cell to terminate delivery of energy to the external short circuit, when internal heat generates a high pressure reconized as potentially dangerous.

Since a condition of high pressure within the cell is indicative of a condition likely to cause an explosive rupture of the cell, a suitable pressure-responsive element is provided in the cell construction to premit venting action to anticipate and thereby prevent an explosive pressure condition; and, also, a suitable pressure-responsive element is provided to open the electric circuit of the cell.

Ordinarily, commercial cells of the dimensions of the -C- cell provide a structure in which a cylindrical can serves as an electrode termianal of negative polarity, and a central axial button, that is suitably insulatingly supported and sealed with respect to the container, is provided to serve as a contact terminal of positive polarity to the external circuit.

As a further precaution in the case of the present cell, because of its relatively hazardous type of operation, the polarity of the electrodes are reversed, in order that cells of this design may not be randomly assembled with ordinary conventional cells of similar dimensions.

At the present state of possible utility, it is contemplated that the uses of these hazardous cells will be limited to specifically military operations, where, usually, many other safeguards are provided and carefully supervised for the sources of energy that are employed.

An object of the invention is to provide a primary cell unit structure utilizing a lithium/sulphur dioxide complex with its extremely high energy density content, and equipped with suitably protective features to ensure against possible explosive ruptures, that could be easily caused by the usual operating conditions for a unit electric primary cell.

Another object of the invention is to provide an efficient structural assembly which may be manufactured to assure the exclusion of moisture that would be detrimental and dangerous within such a lithium/sulphur dioxide cell during operation.

Another object of the invention is to provide a simple and effective operating structure in a lithium/sulphur dioxide electric cell which will embody and function as its own circuit breaker, internally within the cell, when external short-circuiting conditions would normally dictate such an operation between the cell as a source of power and the external circuit supplied thereby.

Another object of the invention is to provide a method of constructing and assembling such a lithium/sulphur dioxide cell to assure a completely dry cell atmosphere, free of harmful moisture.

Another object of the invention is to provide a primary cell employing a lithium/sulphur dioxide operation, with means for selectively venting the cell, gradually for gradually increasing excess internal atmospheric pressure, and quickly for rapidly venting in case of conditions likely to lead to high pressure explosive conditions within the cell.

The details of construction and the method of assembling and forming the cell, and the manner in which the several elements cooperate to provide the desirable safety features, are all described in more detail in the following specification, taken together with the drawings, in which FIG. 1 is a vertical sectional view through a cell of the invention;

This invention generally involves an electric cell utilizing a lithium salt and sulphur dioxide combination disposed in a container suitably sealed to exclude possibility of moisture entering the container, which could cause dangerous explosion, while at the same time protecting the cell against a type of operation that might produce dangerous explosions by reason of the generation of excessive pressures within the cell; with protective features that permit selective venting and internal circuit opening within the cell, when excessive pressure, or temperature, or current, conditions occur in the cell.

Because of the special construction of the cell, and because of the special safeguards that must be taken in assembling a cell for safe operation, the invention includes also a method of construction and assembling the cell to provide the essential safeguards to assure safe operation.

Figure 1:
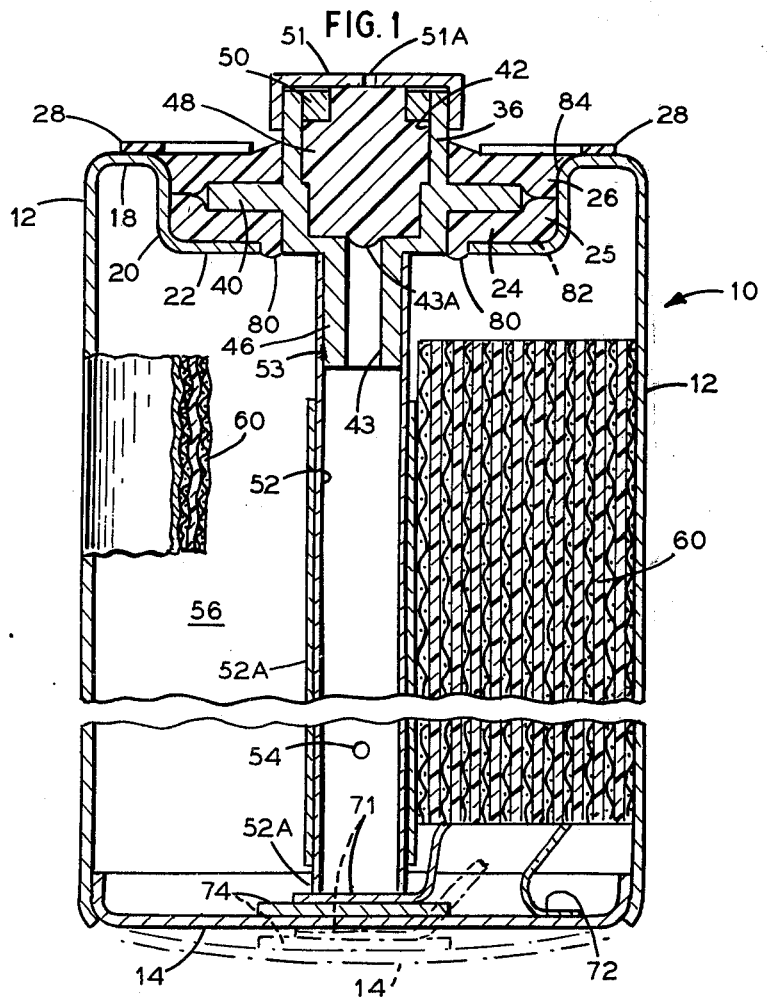

FIG. 1 shows a vertical sectional view taken along the central vertical plane that shows the construction and assembly arrangement of the final cell.

As shown in FIG. 1, a cell 10, in accordance with the invention, comprises an outer enclosing can 12, generally of initially hollow cylindrical form, provided with a bottom closure shown as a metal cup 14, closely fitting internally within the outer can 12 and peripherally welded thereto. The bottom metal cup 14 is distendable under pressure when in the cell, a condition that will be further discussed below, as a feature utilized as a safeguard.

The upper end of the can 12, originally open, is formed and shaped to provide a re-entrant portion consisting of three parts, an annular shoulder end rest 18, an axially inwardly extending circular limiting wall neck portion 20, and a transverse annular seat 22. The annular seat 22 serves to support a double layer sandwich 25, consisting of two layers 24 and 26 as annular rings of insulating material, preferably of an elastomer that will accept compression and retain its resilience in the chemical environment of the cell materials.

Figure 2:
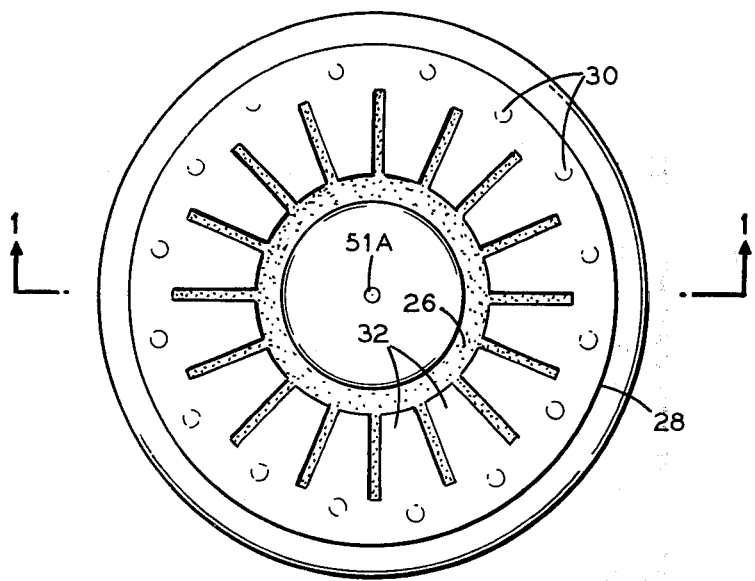
FIG. 2 is a top plan view of the cell.

The double layer sandwich 25, consisting of the two layers 24 and 26 of insulating material, normally fits snugly into the circular space within the circular neck 20 and rests snugly and under pressure on the annular seat 22, due to the compression force impressed by a final assembly pressure ring 28, whose outer peripheral border is anchored by welding onto the annular reentrant shoulder end rest 18 of the upper end of the container 12, at arcuately spaced spots 30, as shown in FIG. 2. As shown in FIG. 2, the annular pressure ring 28 is appropriately slotted to provide a plurality of inwardly extending radial vent fingers 32 which are supported and disposed in pre-stressed condition in order to impress a downward pressure force on the top layer 26 of the insulating supporting sandwich 25.

The insulating sandwich 25 serves to support a hollow cylindrical metallic supporting shell 36, that has an external annular peripheral flange 40 which seats and nests between the two sandwich layers 24 and 26 in order to be insulatingly supported by them. The metallic supporting shell 36 is axially hollow and has an upper bore 42 to define an upper inner chamber at its upper open end, that communicates, at its lower end, with an extending passage 43A of lower and smaller bore 43 within a coaxial extenion 46 of the shell body 36. The function of the supporting shell 36 at its upper end is to support a plug seal 48, of suitable elastomeric material, to substantially fill and close the shell chamber 43. The plug seal 48 will later serve as a plug through which a hypodermic needle will be inserted through the sealing plug 48 for evacuating the container can 12 and for then conducting the electrolyte into the cell for filling the evacuated space with the sulphur dioxide solution that is to serve as the electrolyte for the cell.

In order to maintain the elastomeric seal plug 48 compressed for good pressure engagement with the inner wall surface of shell 36, a pressure and retainer ring 50 is employed, which is dimensioned to fit with a snug pressure fit into the upper open end of the supporting shell 36, to which the ring is then suitably bonded, as by brazing, with a material such as Woods metal, which has a definite melting point at a predetermined temperature at which it is desired to permit the ring 50 to be released from sealing bond with the shell 36. The melting point of Woods metal at 170° Fahrenheit is enough above the normal safe operating temperature of 160°, to provide quick detection of a dangerous temperature condition.

The tube 52 is spot welded to the depending bracket 46, as indicated by the weld spot 53. The tube 52 has several functions. It is provided with one or more fill-ports 54, which are small openings drilled through the wall of the tube 52, to provide communication with the main chamber 56 of the cell, that accommodates the working chemical components and the electrolyte in general.

The tube 52 serves a primary function here as a stationary contact element of a circuit breaker within the cell. The lower circular end 52A of tube 52 serves as a stationary contact surface of such circuit breaker, at which the circuit of the cell is opened to disconnect the cell from an external circuit.

The tube 52 also serves as a central axial spacer for the helical wraparound 60 which includes the working electrodes of the cell.

Figure 3:
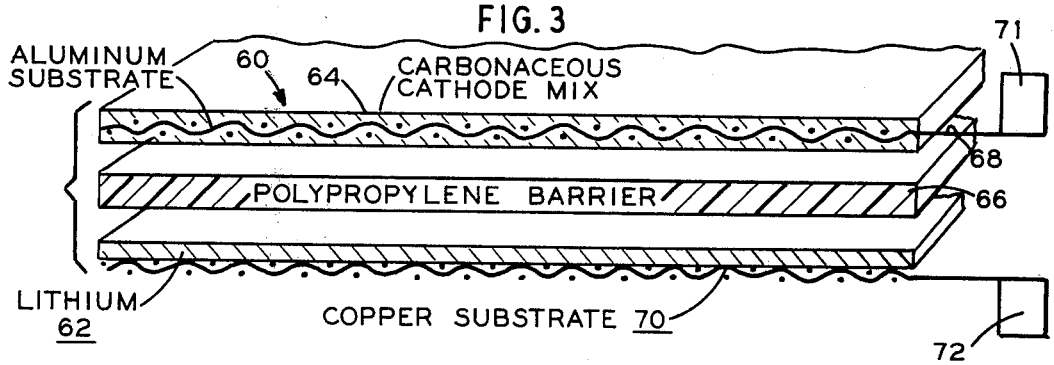
FIG. 3 is a sectional view of the layered anode and cathode in planar assembly, before it is helically wound and disposed in the cell container.

In FIG. 3, the working electrodes are shown in assembly at an intermediate stage of assembly, with a lithium sheet 62 as the working anode of the cell, and a sheet layer of carbonaceous mix 64 as cathode separated from the lithium by a perforated polypropylene barrier 66.

The lithium sheet 62 is 0.010 inch thick, impressed in and supported on a copper substrate 70, which may be perforated or of mesh structure. The carbonaceous cathode depolarizer mix 64 is about 0.030 inch thick buttered on the aluminum substrate 68, also of perforated thin sheet or mesh structure. This layered assembly is provided with two tabs, electrically connected to the respective substrates. Tab 71 is connected to the cathode 64, 68, and tab 72 is connected to the anode lithium and substrate 62, 70.

During manufacturing assembly of the cell, the planar assembly 60 is wrapped into helical form for axial insertion into the cam 12 from the bottom, to be slipped onto and over the center tube 52, into space 56. The copper tab 72 has been welded to a convenient area 14A, on the bottom closure cup 14. The other tab 71 is secured to an insulation disc 74, which is secured to a central region of the bottom closure cup 14, to take advantage of the maximum axial movement and displacement of that bottom closure cup when distended by excess pressure within the cell. In the initial dry assembling operation, the helical electrode assembly is thus physically connected to the bottom closure cup 14 as a sub-assembly, which is then inserted into the can 12 to place the electrode assembly in operating position in chamber 56, and to place the closure cup in position to close the can bottom ready for welding and sealing. At the same time, the can bottom cup 14 is moved to proper position to place the depolarizer contact tab 71 of FIG. 3 into contact with the bottom edge 52A of tube 52.

Normally, when the bottom end of the tube 52 engages the contact tab 71, the circuit through the cell is from the top safety cap 50 down through the metallic shell support 36, thence through the tube 52 down to and through the depolarizer contact tab 71 through the working cell elements including cathode depolarizer 64, the electrolyte, and the anode 62 to the anode tab 72, the bottom closure cup 14, and the can 12 to which the closure cup is suitably sealed by welding.

The bottom of the tube 52 is kept in contact with the depolarizer contact tab 71 by the normal resilient pressure of the bottom cup 14, pressing upwardly through the insulator disc 74, which has been appropriately secured to the inner surface of the can bottom cup 14.

During normal operations the pressure in the cell is not high enough to distend the can bottom cup 14, and therefore the contact between the tube bottom 52A and the depolarizer contact tab 71 is highly conductive and of minimum resistance, under the pressure of the bottom cup 14.

Upon the occurence of one of the undesirable conditions that results in an increased pressure within the can, that increase in pressure reacts on the flexible bottom cup 14 of the can and causes the cup to distend outward, as indicated by the dotted line 14A, and the outward distended movement of the bottom cup 14 moves the insulator and the depolarizer contact tab away from, and out of contact with, the bottom edge 52A of the tube 52. The cell circuit is thus interrupted at the bottom edge of the tube 52, to disconnect the operating elements of the cell from the tube 52, and, consequently, from the top outer safety cap 50, that serves also as the terminal connected to the depolarizer cathode material during normal operation of the cell.

Even though the circuit of the cell is thus internally opened, so that further operating cell current transfer is terminated, there may still be conditions within the cell that continue to generate heat that will raise the temperature within the cell and thus increase the pressure to an explosive value that could be dangerous to anyone within the proximity of the cell, if such pressure were permitted to continue to increase. There are, thus, two conditions that are indicative of a possible dangerous explosion, namely, the temperature developed within the cell, and a possible resulting pressure.

If the pressure condition changes gradually, as might be caused by a normal loading of the cell, but without the occurrence of a necessarily hazardous situation, adequate protection may be provided to the cell by merely permitting and providing for slight venting. Upon the occurence of conditions of that kind, the vapor pressure gas within the cell may press against the under surfaces of the bottom sandwich layer 24, as at the region indicated by the arrows 80, and then move out in thin gas layer or strip form along the under surface of that bottom sandwich layer 25, as for example, along a path indicated by the dotted line 82, up to the space 84 directly underneath the radially extending fingers 32. Those fingers 32 are supported as cantilever beams at their rear regions, adjacent the weld points 30, so that the forward ends of those cantilevered fingers 32 may rise slightly from the top surface of the upper sandwich layer 26, to permit a small bubble of the gas to exit from the cell and thereby relieve the pressure within the cell sufficiently to hold that pressure down below a dangerous pressure value within the cell.

Thus, under normal operating conditions, where the cell is properly doing the work for which it was intended, and the energy supplied by the cell is not creating a dangerously abnormal condition, simple occasional venting, of a small amount of the electrolyte vapor as a gas, may be sufficient to protect the cell from accumulating an excessive pressure internally, and the operation of the cell may continue without danger or hazard to anyone in the environment of the cell.

If however, a condition develops within the cell, due to internal or external conditions, that causes a fast temperature rise, that would undoubtedly cause a subsequent pressure increase, the high thermal conductivity of the tube 52 and its supporting frame shell 36 are utilized to conduct the heat to the plug seal retaining ring 50, and to soften the bonding material of that ring sufficiently to release the ring from the shell 36. Consequently, pressure on the elastomeric plug seal material 42 is relieved to permit the compressed plug seal to expand to full volume of its uncompressed condition, and, thereby, to relieve the pressure of that seal 42 on the inner wall surfaces of the shell 36, to permit the gases within the cell container to rush out quickly, through the openings or ports within the tube 52, and up through the central axial passage 44 into the internal chamber of the cell 36, past the relieved loose plug seal 42, and out through the dimple opening 51A, formed in the top of the seal safety cap 51 after the spot weld closure during manufacture.

Thus, on the occurrence of dangerous temperature, an immediate rise in pressure, or even in case of a delayed rise in pressure, the cell is able to control itself by the three provisions noted, namely, first, by the switch opening as a circuit-breaker operation at the bottom of the tube 52, by the distention of the can botton 14; or, secondly, by the slow leakage along the path 82 up through and past the cantilever spring fingers 32; or, thirdly, by the fast release of the gas pressure out through the top plug seal and safety cap, where the temperature rise indicates an extremely dangerous condition that is probably likely to lead to an explosion.

In manufacturing assembly, the elements of the cell are assembled in position in the can, and the can is dry sealed, before the electrolyte is introduced, and the seal plug is compressed against the inner wall of the shell 36 and held in such compressed condition by the retainer ring 50.

At this time, the elastomeric materials of the sandwich support 25 and of the seal plug 48 are tightly compressed against their adjacent compression and supporting surfaces, to provide an adequate seal for the cell. The cell can is now ready to be filled with the electrolyte.

Figure 4:
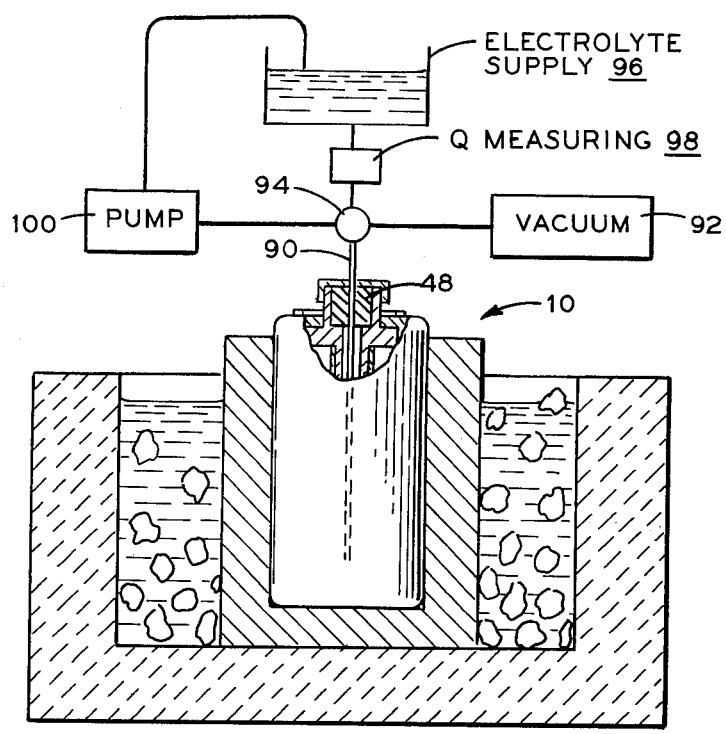
FIG. 4 is a schematic view of the system for injecting an electrolyte into an individual cell after the container has been dry sealed with the electrode component elements inside the container.

To accomplish the filling operation, a filling system is utilized such as is shown in FIG. 4. A hypodermic needle 90 is thrust downward into and through the full length of the seal plug 48, to extend down below the plug into the region of the depending portion 46 of the supporting shell 36, in order to couple the inner space of the cell into communication with a vacuum system 92, through a three-position valve 94, which serves in one position to connect the cell to the vacuum system, and in the second position to connect the cell 10 to the electrolyte supply 96, and in its third position to withdraw any excess electrolyte from the needle before a subsequent filling operation.

After the hypodermic needle is inserted down into the cell space, the valve 94 is moved to its position to connect the vacuum system to the cell, to evacuate the cell to a predetermined vacuum level, as well as to assure that the cell is free of any moisture. The cell is then ready to receive its charge of electrolyte.

The valve 94 is then moved to its filling position, at which the electrolyte from the supply 96 is directed into the cell, in a predetermined premeasured quantity, as measured in a volumetric measuring device 98 to assure the introduction of a definite quantity of the electrolyte into the cell.

After the desired quantity of electrolyte is introduced into the cell, the excess electrolyte in the hypodermic needle 90 is withdrawn through the valve and a suitable vacuum pump 100, and returned to the electrolyte supply to prevent contamination of the atmosphere.

The needle 90 is then completely withdrawn from the seal plug 48, and the elastomeric characteristics of the seal plug 48 reclose the opening behind the withdrawing needle, and reseal that opening, so the sealing action of the plug continues to maintain the cell hermetically sealed, against admission of anything from the ambient atmosphere. At this time, the vapor pressure of the electrolyte within the cell is positive, so that there is no tendency to draw any of the ambient atmosphere into the cell, during withdrawal of the hypodermic needle.

As indicated in FIG. 4, the cell is cooled, while being filled, to a temperature below minus 10° Centigrade, to help the electrolyte in liquid state. The apparatus schematically shows the cell held in a metal block of high thermal conductivity, immersed in a bath maintained at the desired low temperature.

Figure 5:
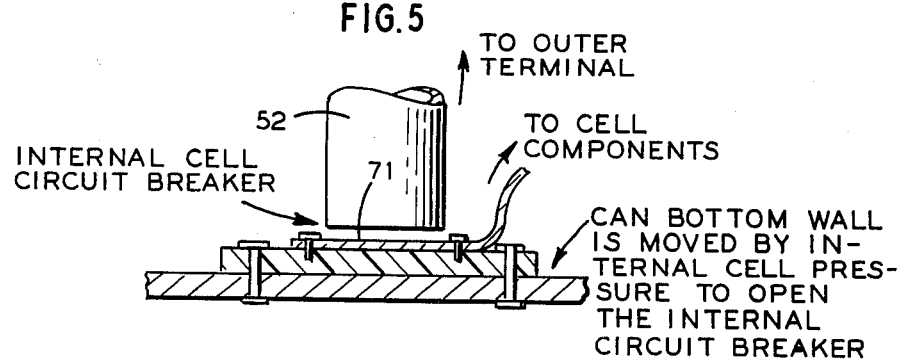

In FIG. 5, the structure of the internal circuit breaker switch is shown in more detail.

The details of construction and the method of filling and assembly may be variously modified without departing from the spirit and scope of the invention as defined in the claims.

What is claimed is:

1. A self-controlling electric primary cell constructed to limit or prevent internal pressure likely to lead to explosive rupture, said cell comprising
    a. a container enclosure;
    b. anode means;
    c. cathode means comprising a depolarizer cathodic body disposed within the cell container;
    d. an electrolyte for electrochemically relating said anode means and said cathode means to generate an electric current between them for conduction to an external circuit;
    e. an outer electrode element disposed on the outside of said container;
    f. an electrical circuit conductor extending from said depolarizer body to said outer electrode element, said circuit conductor consisting of a filling tube for introducing a fluid electrolyte component into the container can during manufacture, and wherein said filling tube serves as a stationary switch element;
    g. electrical switching means disposed within said cell enclosure and responsive to an undesirable operating condition within the cell, which prevent the aggravation of said condition by opening the circuit between the electrical circuit conductor, the depolarizer and the outer electrode element, wherein the undesirable condition is excessive pressure caused by excessive temperature and excessive current;
    h. said electrical switching means including a movable switch element, which cooperates with the stationary switch element and is controlled by said condition within the container.

2. A self-controlling electrical cell, as in claim 1, in which
    said container enclosure supports said movable switch element; and
    said container enclosure embodies an element subject to differential pressure, between internal cell pressure and external ambient pressure, for controlling the movable switch element.

3. A self-controlling electric cell, as in claim 1, in which said container enclosure includes
   a. a seal between the inside of the container and the outside atmosphere;
   b. means for holding said seal under closing compression; and
   c. said seal-holding means includes a pressure-responsive element, normally closed but responsive to predetermined excess atmospheric pressure in the container enclosure, for temporarily moving to pressure-relieving position to relieve and reduce excessive atmospheric pressure within the container enclosure.

4. A self-controlling electric cell, as in claim 3, in which
   said container enclosure is a cylindrical can having a longitudinal axis, with an original open end edge border folded re-entrantly inward and flanged transversely of the axis to define an annular seat;
   a double-layer sandwich seal of insulating material rests on said annular seat;
   a co-axially disposed current-conductor is supported by and depends from said double-layer seal; and
   an annular closure element is secured to the effective outer end of said infolded can, and rests on said seal to hold said seal in place for effective sealing action.

5. A self-controlling electric cell, as in claim 4, in which
   said annular closure embodies a pressure-responsive element disposed and operative to move to pressure-relieving position for the atmosphere within the can, when such pressure exceeds a predetermined value.

6. A self-controlling electric cell, as in claim 4, in which
   said current-conductor embodies a supporting element, and said supporting element is disposed for support between said double-layers of said sandwich seal.

7. A self-controlling electric cell, as in claim 6, in which
   said current conductor has a top outer end that extends upward beyond the top surface of said seal; and
   a cover cap rests on said top outer end of said current conductor to serve as an external electrode of the cell.

8. A self-controlling electric cell, as in claim 1, in which said container enclosure includes:
   a. a seal between the inside atmosphere of the container and the outside ambient atmosphere;
   b. means for holding said seal under closing compression; and
   c. said seal-holding means includes a temperature-responsive element, normally rigidly anchored in place to hold said seal in closing compression, and responsive to predetermined excess temperature for moving from anchored position to release said seal to permit said seal to adjust to pressure-relieving position for the atmosphere within the container.

9. A self-controlling electric cell, as in claim 8, in which
   said temperature-responsive element is disposed to be responsive to the atmospheric temperature developed within the cell container.

10. A self-controlling electric cell, as in claim 1, in which said container enclosure includes:
   a. sealing means between the inside atmosphere of the container and the outside ambient atmosphere;
   b. means responsive to predetermined excess pressure within said container for relieving said pressure at one region of said sealing means; and
   c. means responsive to predetermined excess temperature, - likely to cause explosive rupture of the cell due to temperature-generated pressure, - for relieving said pressure at another region of said sealing means.

11. A self-controlling electric cell, as in claim 1, in which said container enclosure includes:
   sealing means between the inside atmosphere of the container and the outside ambient atmosphere;
   and means separately responsive to predetermined pressure of atmosphere within said container, or to predetermined temperature of the atmosphere within said container, for selectively controlling said sealing means to selectively effect easy gradual pressure relief of the internal atmospheric pressure, or rapid complete pressure relief of the internal atmospheric cell pressure in said container.

12. A self-controlling electric cell, as in claim 3, in which
   said pressure-responsive element of said seal-holding means consists of an annular ring with individual radial fingers extending radially inward as cantilever elements.

13. A self-controlling electric cell, as in claim 1, in which
   one electrode terminal element is disposed as a linear element co-axially within said container; and
   said anode means and said cathode means are respectively in sheet form, both layered mutually co-planarly, and together helically wrapped around said co-axial linear element.

14. A self-controlling electric cell, as in claim 1, in which
   said anode means constitutes a lithium layer on a copper substrate;
   said cathode means constitutes a carbonaceous cathodic mix layer on an aluminum substrate;
   and said cathode means and said anode means are planarly layered and separated by a thin sheet of insulating material, to constitute a three-layer composite.

15. A self-controlling electric cell, as in claim 14, in which said container is elongate about a longitudinal axis;
   an electrically conductive linear element is axially supported along said axis within said container;
   and said three-layer composite is helically wrapped around said linear element.

16. An electric cell, as in claim 1, in which
   said container enclosure has a wall that embodies a pressure-distendable part, that has a normal position while the internal pressure in the cell container enclosure is below a predetermined value, and that has a distended position to which it is moved when said internal pressure exceeds that predetermined value;
   and said means for preventing aggravation of said undesirable condition includes a circuit-controlling switch.

17. An electric cell, as in claim 16, in which said circuit controlling switch includes a stationary conducting element and a cooperating movable conducting element in the electron circuit path of the cell, said movable conducting element being controllable by said distendable part to be moved to a position where said movable element normally engages said stationary conducting element, so long as internal atmospheric pressure in said cell is below a predetermined value, and controllable by said distendable part to be moved to a separated position to disengage said stationary conducting element, when said internal pressure in said cell reaches and exceeds said predetermined value.

* * * * *